United States Patent
Graceffo et al.

(10) Patent No.: US 9,525,574 B1
(45) Date of Patent: Dec. 20, 2016

(54) METHODS AND APPARATUS FOR CONSTANT BAUD RATE COMMUNICATION WITH VARYING EFFECTIVE DATA RATE

(71) Applicant: Raytheon Company, Waltham, MA (US)

(72) Inventors: Gary M. Graceffo, Burke, VA (US); Andrew Kowalevicz, Arlington, VA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 14/853,067

(22) Filed: Sep. 14, 2015

(51) Int. Cl.
*H04B 1/69* (2011.01)
*H04B 1/707* (2011.01)
*H04B 1/713* (2011.01)
*H04L 25/493* (2006.01)
*H04B 1/04* (2006.01)

(52) U.S. Cl.
CPC .......... *H04L 25/493* (2013.01); *H04B 1/0475* (2013.01)

(58) Field of Classification Search
CPC ...... H04L 25/493; H04B 1/0475; H04B 1/707
USPC ................. 375/140, 141, 146, 147
See application file for complete search history.

(56) References Cited

U.S. PATENT DOCUMENTS 6,724,806 B2 * 4/2004 Okumura et al. ..... H04B 1/707
375/142

* cited by examiner

*Primary Examiner* — Phuong Phu
(74) *Attorney, Agent, or Firm* — Schwegman Lundberg & Woessner, P.A.

(57) ABSTRACT

Methods and apparatus for transmitting data at a varying effective data rate (EDR) at a constant baud rate by encoding the data prior to transmission with a sequence. In embodiments, the sequence comprises a pseudo random number sequence, Barker sequence, and/or other sequence. Embodiments of a receiver decode the data transmitted at a varying effective data rate (EDR) at a constant baud rate by encoding the data prior to transmission with a sequence.

20 Claims, 9 Drawing Sheets

METHODS AND APPARATUS FOR CONSTANT BAUD RATE COMMUNICATION WITH VARYING EFFECTIVE DATA RATE

BACKGROUND

In adaptive communication systems, the data rate is adjusted in response to changing channel conditions. The objective of the adjustments is to maintain the ratio of energy per bit (Eb) to channel noise density (No) (Eb/No) at a constant value, commensurate with the desired bit error rate (BER). Assuming communication channel parameters remain constant, the data rate will determine the system BER. When the communications channel is relatively noise free, greater data rates are used. Conversely, as the channel becomes nosier the data rates are reduced. A change in the data rate increases or decreases the transmitted Eb, this in turn, increases or decreases the ratio of Eb/No respectively.

To respond to varying noise conditions in conventional systems, system operators typically step up power, increase coding gain, or reduce data rates. Stepping up power is generally limited due to FCC regulations and other operational and practical considerations. Increasing coding gain or reducing data rates are also options, however, they result in baud changes. Baud changes require changes to the transmitter and the receiver hardware and software.

SUMMARY

The present invention provides method and apparatus for achieving constant baud rate communication by encoding the data prior to sending to a transmitter. In embodiments, the data is encoded using a pseudo random number sequence (PRNS), a Barker Sequence, or the like. While these sequences are conventionally used to spread energy in direct sequence spread spectrum systems, which reduces the energy per bit, in embodiments of the invention the inverse is performed—the energy per bit is multiplied by the length of the encoding sequence. In a conventional communications system, the bit rate is equal to the information rate and the baud rate is proportional to the data rate. In embodiments of the invention, the information rate is reduced by a factor of N, while keeping the baud rate constant. The reduced information rate is the Effective Data Rate (EDR). The baud rate is still proportional to the data rate; however, it remains constant. The EDR is equal to the data rate divided by N, the length of the encoding sequence. When N is one, the data rate and EDR are equal. When N greater than 1 the EDR is less than the data rate. The result is that baud rates remain constant, while the EDR varies to provide the required Eb/No.

In general, embodiments of the invention provide a system in which the baud rate remains constant as the effective data rate changes. Changes in the effective data rate do not require changes to the hardware or software in the transmitter. Changes in the effective data rate require changes to the matched filters, for example, in the receiver. Reducing the effective data rate improves link performance by increasing the energy per bit by a factor of N, where N is the length of the encoding sequence. Embodiments of the invention reduce system complexity and total component cost without sacrificing functionality or performance.

In one aspect of the invention, a method comprises: transmitting data at a varying effective data rate (EDR) at a constant baud rate by encoding the data prior to transmission with a sequence. The method can further include one or more of the following features: the sequence comprises a pseudo random number sequence, the sequence comprises a Barker sequence, multiplying an energy per bit by a length of the sequence, wherein the EDR corresponds to the data rate divided by the length of the sequence, transmitting the data at a constant ratio of energy per bit(Eb) to channel noise density (No), and/or varying the effective data rate based upon channel noise.

In another aspect of the invention, a system comprises: a transmitter configured to transmit data at a varying effective data rate (EDR) at a constant baud rate by encoding the data prior to transmission with a sequence. The system can further include one or more of the following features: the sequence comprises a pseudo random number sequence, the sequence comprises a Barker sequence, the transmitter is further configured to multiply an energy per bit by a length of the sequence, wherein the EDR corresponds to the data rate divided by the length of the sequence, the transmitter is further configured to transmit the data at a constant ratio of energy per bit(Eb) to channel noise density (No), and/or the transmitter is further configured to vary the effective data rate based upon channel noise.

In a further aspect of the invention, a method comprises: decoding data that was transmitted at a varying effective data rate (EDR) at a constant baud rate by encoding the data prior to transmission with a sequence. The method can further include one or more of the following features: the sequence comprises a pseudo random number sequence, the sequence comprises a Barker sequence, the received data was transmitted at a constant ratio of energy per bit(Eb) to channel noise density (No), and/or the received data was transmitted after varying the effective data rate based upon channel noise.

In a further aspect of the invention, a method comprises: varying an effective data rate (EDR) between a receiver and a transmitter using a constant baud rate using a sequence to encode data prior to transmission by the transmitter.

BRIEF DESCRIPTION OF THE DRAWINGS

The foregoing features of this invention, as well as the invention itself, may be more fully understood from the following description of the drawings in which.

DETAILED DESCRIPTION

Before describing embodiments of the invention, some information is provided. In conventional adaptive communication systems, the data rate is adjusted in response to changing channel conditions. The objective of the adjustments is to maintain the ratio of energy per bit (Eb) to channel noise density (No) (Eb/No) at a constant value, commensurate with the desired bit error rate (BER). Assuming communication channel parameters remain constant, the data rate determines the system BER. When the communications channel is relatively noise free, greater data rates are used. Conversely, as the channel becomes nosier the data rates are reduced. A change in the data rate increases or decreases the transmitted Eb, this in turn, increases or decreases the ratio of Eb/No.

A change in the transmitted data rate of a system, results in a change in the system baud rate. To support a baud rate change, the data clock rate, filter bandwidths, etc., must be increased or decreased to reflect the changes. Additionally, corresponding changes are required in the receiver. In a conventional communications system, the baud rate varies as the data rate changes.

In general, embodiments of the invention provide methods and apparatus for varying a data rate without changing the system baud rate. That is, the data clock, filter bandwidths, etc., do not need to be modified. With this arrangement, the transmitted baud rate remains constant and is invariant to changes in the data rate. Thus, no changes to the transmitter are required and a change to the matched filters, for example, in the receiver is required.

To achieve a constant baud rate, embodiments of the invention include encoding data prior to sending to the transmitter. In illustrative embodiments, the data is encoded using a pseudo random number sequence (PRNS) or a Barker Sequence. While in conventional systems, such sequences are used to spread energy in direct sequence spread spectrum system for reducing the energy per bit, in embodiments of the invention the sequences are used in an inverse way, since the energy per bit is multiplied by the length of the encoding sequence. This will of course reduce effective data rate (EDR).

In a conventional communications system, the bit rate is equal to the information rate and the baud rate is proportional to the data rate. In the proposed system, the information rate is varied by a factor of N, while keeping the baud rate constant. The baud rate is still proportional to the data rate; however, it remains constant. The EDR is equal to the data rate divided by the length N of the encoding sequence. When N is one, the data rate and EDR are equal. When N greater than 1 the EDR is less than the data rate. The result of this process is that the baud rates remain a constant, while the EDR varies to provide the desired Eb/No.

Figure 1:
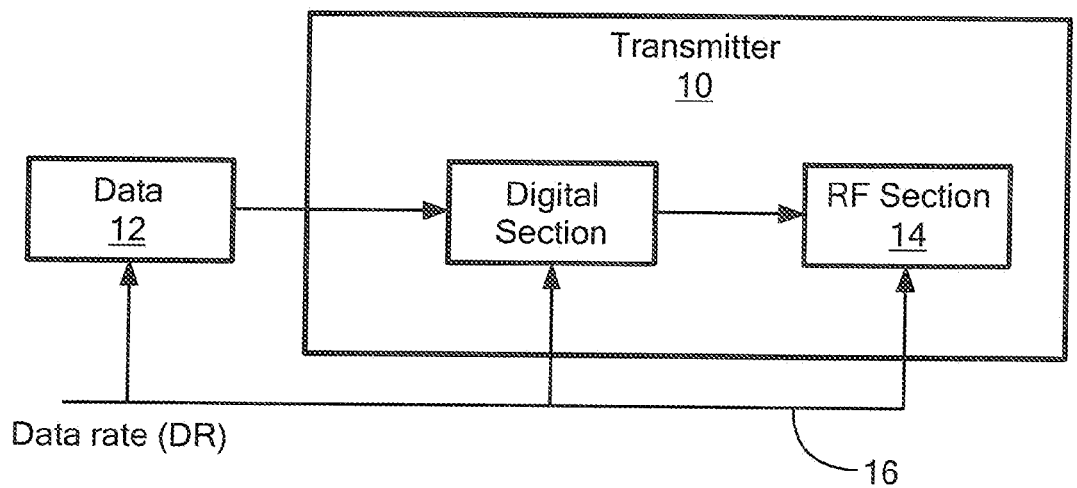
FIGS. 1 and 1A are a schematic representation of prior art transmitters.
Figure 1A:
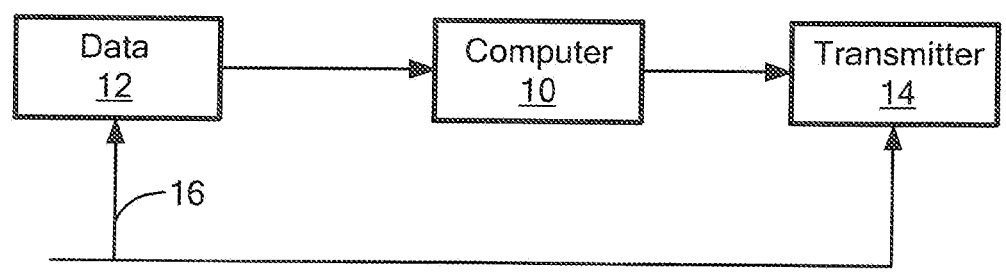

FIG. 1 shows a conventional transmitter system 10 having a data module 12 and a transmitter 14 each receiving a clock signal 16 to clock data in at the data rate (DR) in bits/sec. The hardware in the transmitter 14 is configured for a determined data rate and bandwidth. FIG. 1A shows a conventional transmitter having a computer 10 coupled between the data module 12 and the transmitter 14. For a BPSK transmitter, for example, the baud rate and data rate are equal. If the data rate were increased or decreased, the baud rate would monotonically track with the data rate change. Additionally, filter bandwidths and other system clocks would require adjusting to reflect the change in data rate. For the architecture of FIG. 1, the energy per bit is given by Equation 1 below:

$$E_b = \frac{\text{Transmitter Power}}{\text{Data Rate}} \quad (1)$$

Figure 2:
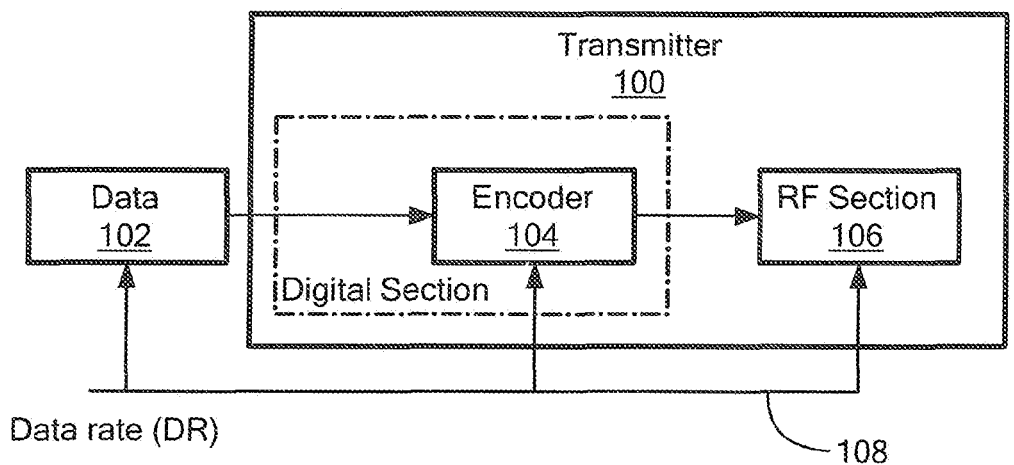
FIGS. 2 and 2A are schematic representations of transmitters having constant baud rate in accordance with illustrative embodiments of the invention.
Figure 2A:
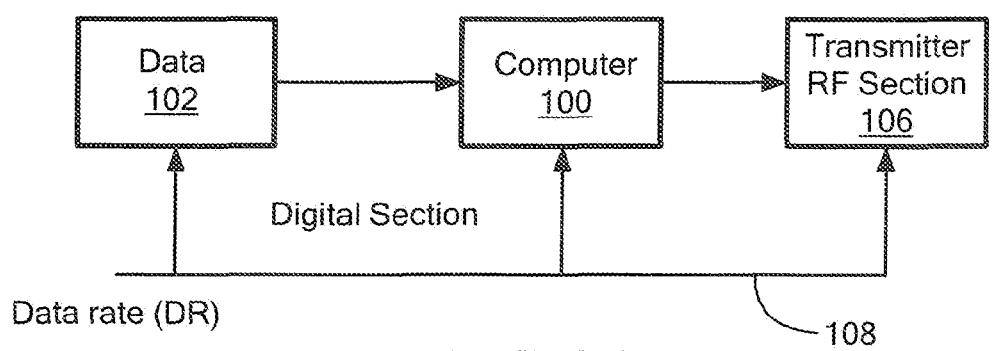

FIG. 2 shows a transmitter system 100 having a data module 102, an encoder module 104, and a transmitter module 106, each receiving a clock signal 108 in accordance with illustrative embodiments of the invention. FIG. 2A shows an alternative embodiment in which a computer is coupled between the data module 102 and the RF transmitter 106. In this arrangement, the baud rate is equal to the data rate (DR); however, the effective data rate (EDR) is reduced using a pseudo random number sequence (PRNS), a Barker sequence, or other suitable sequence, by the sequence length N, described in Equation 2 below:

$$EDR = \frac{\text{Data Rate}}{N} \quad (2)$$

$$E_b = \frac{\text{Transmitter Power}}{EDR}$$

$$E_b = \frac{\text{Transmitter Power}}{\text{Data Rate}} * N$$

It will be appreciated that the data, by a factor of N, increases Eb, keeps the baud rate constant, and requires no changes to the transmitter. Changes are required to the matched filters, for example, in the receiver and the EDR is reduced, as described more fully below.

Example 1

A system experiences a link margin deficit:
Given:
  Modulation: BPSK
  Data rate: 400 kbps
  Eb/No: 4 dB (Measured)
  Eb/No: 10 dB (Required)
  The system has a deficient of 6 dB
If the data is encoded with a Barker sequence of length 4, (N=4), the system performs as follows:
  Eb/No: 4 dB+10 log(4)=10 dB
  Effective Data Rate=100 kbps
  Data rate: 400 kbps Example 2

A system experiences a link margin excess:
Given:
  Modulation: BPSK
  Data rate: 400 kbps
  Effective Data Rate: 50 kbps
  Data encoding length: 8
  Eb/No: 18 dB (Measured)
  Eb/No: 12 dB (Required)
The system has an excess margin of 6 dB
  If the data is encoded with a sequence of length 2, (N=2) instead of 8, the system will perform as follows:
  Modulation: BPSK
  Data rate: 400 kbps
  Effective Data Rate: 200 kbps
  Data encoding length: 2
  Eb/No: 12 dB (Measured)
  Eb/No: 12 dB (Required)
  The system has an excess margin of 0 dB.

Figure 3:
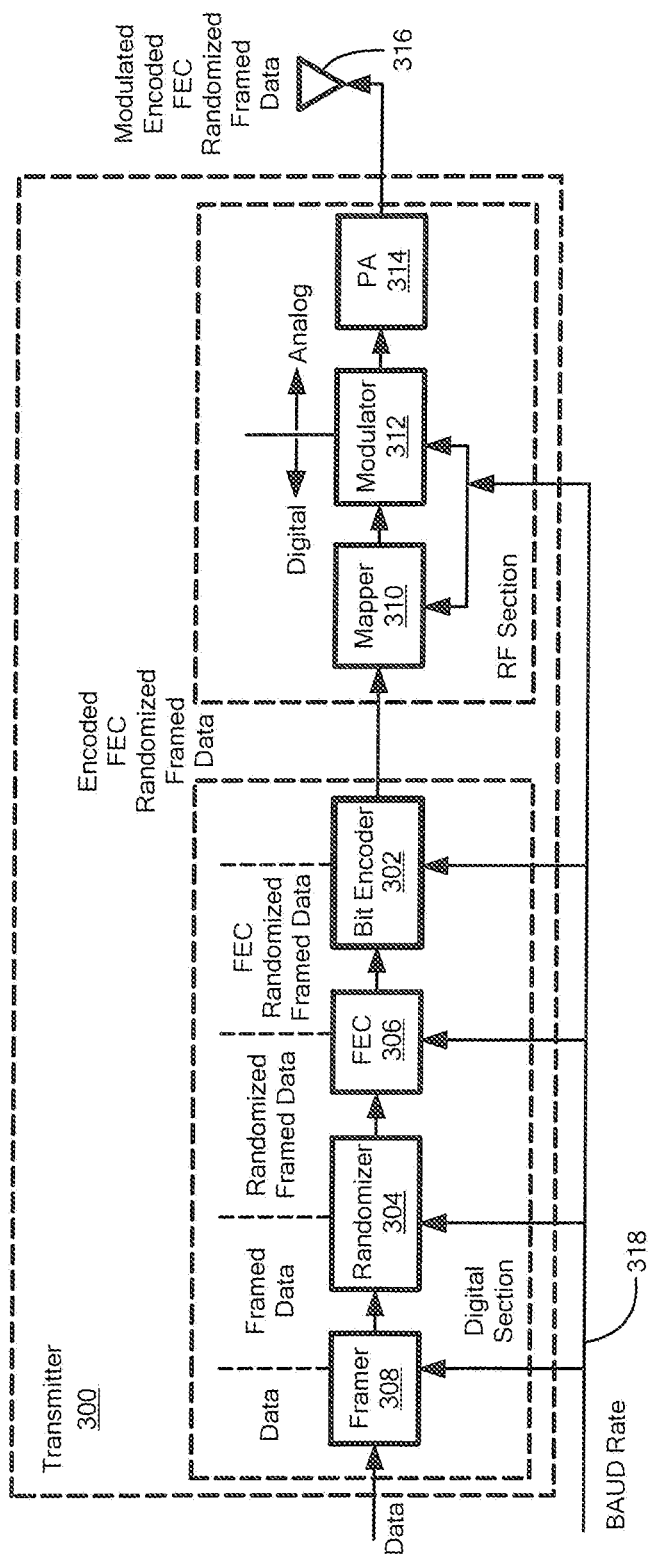
FIG. 3 is a schematic representation showing further detail of the transmitter of FIG. 2.

FIG. 3 shows additional detail for a system 300 having a constant baud rate transmitter in accordance with illustrative embodiments of the invention. The data to be transmitted is provided to the framer module 308, randomizer module 304 and the Forward Error Correcting (FEC) encoder module 306. The output of 306 is provided to a bit encoder module 302. Encoding can be performed using a PRNS, a Barker Sequence, or other suitable sequence. The encoded data is provided to a mapper module 310 that maps the data for a modulator module 312. The modulated data is provided to a power amplifier (PA) module 314 for transmission into free space by an antenna 316. A constant baud rate clock signal 318 is provided to the system modules as shown.

Figure 4:
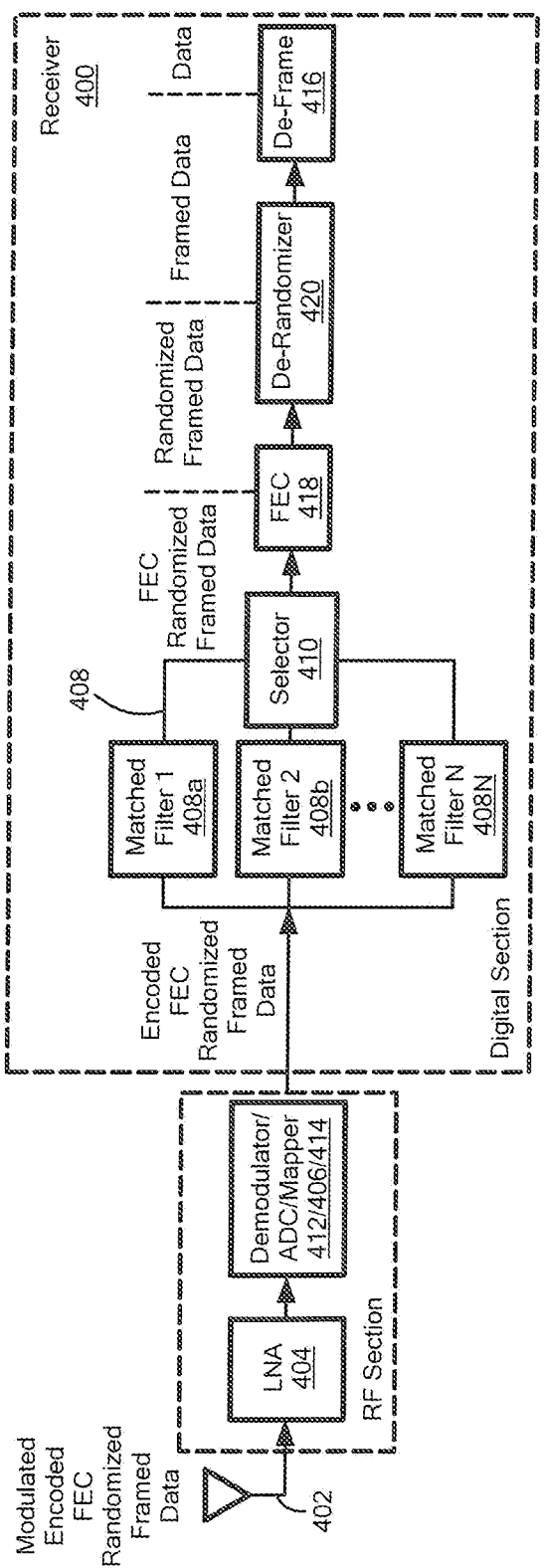
FIG. 4 is a schematic representation of constant baud rate receiver in accordance with illustrative embodiments of the invention.

FIG. 4 shows an illustrative receiver system 400 for a constant baud rate in accordance with illustrative embodiments of the invention. An antenna 402 receives a signal from a transmitter and provides the signal to a low noise amplifier (LNA) 404 the output of which can be demodulated (412), digitized with an analog-to-digital converter (ADC) module 406 and mapped by the mapper module (414). In the illustrative embodiment, a filter module 408 includes a parallel bank of matched filter modules 408a-N to receive the digitized data. The bank of matched filters are used to determine which of the available Pseudo Random Number Sequences (PRNS) the signal has been encoded with. That is, each matched filter is matched to a particular PRNS. The selector module 410, continually polls the output of each filter and selects the one with the greatest output voltage. The filter with the greatest voltage output is properly matched to the PRS applied to the incoming signal. Once the appropriate matched filter is determined, the state of the filters output determines whether the symbol is a 1 or a 0. If the signal sample is correlated with the filter then the symbol is a 0. If the symbol is an anti-correlation, then the symbol is a 1. The output from the selector module 410, is provided to the FEC module 418, the output of the FEC module is provided to the derandomizer module 420 and the de-framer module 416. The output of the de-framer module 416 is the original transmitter bit stream.

It is understood that modules 408 and 410 are needed to decode the data that was encoded by encoder module 302 (FIG. 3) in the transmitter. As noted above, the encoder/decoder can use PRNS, a Barker sequence, or any other suitable sequence for the data. It is further understood that the encoder/decoders shown in FIGS. 3 and 4 are not needed in a conventional constant baud transmitter/receive system.

Figure 4A:
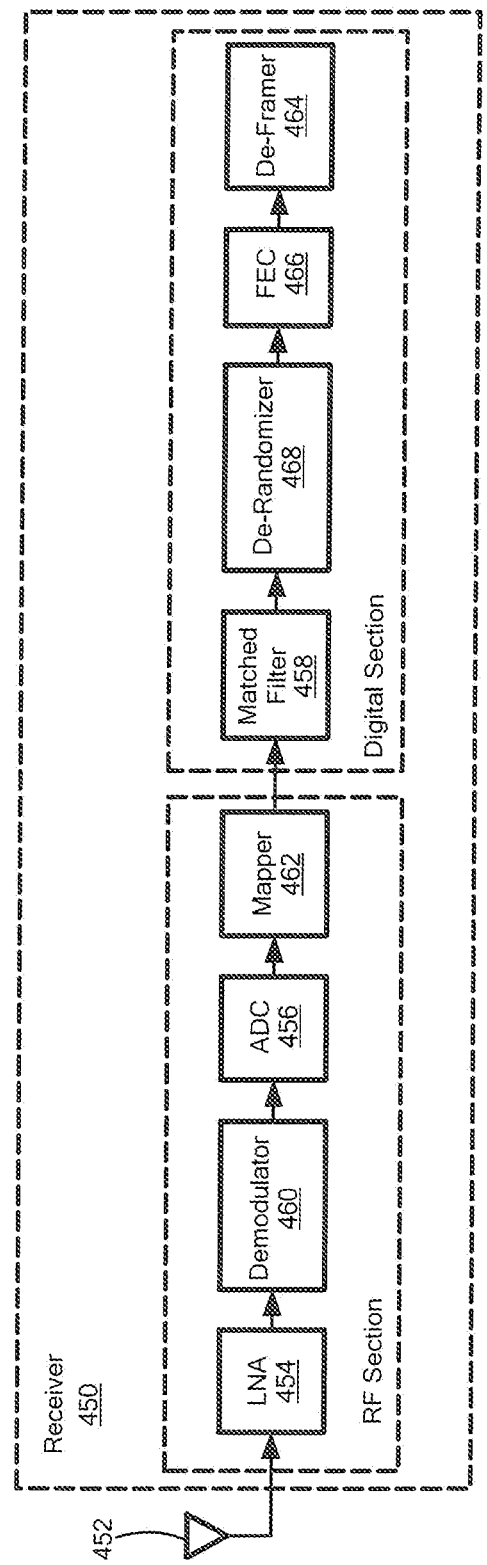
FIG. 4A is a schematic representation of a prior art receiver.
Figure 4B:
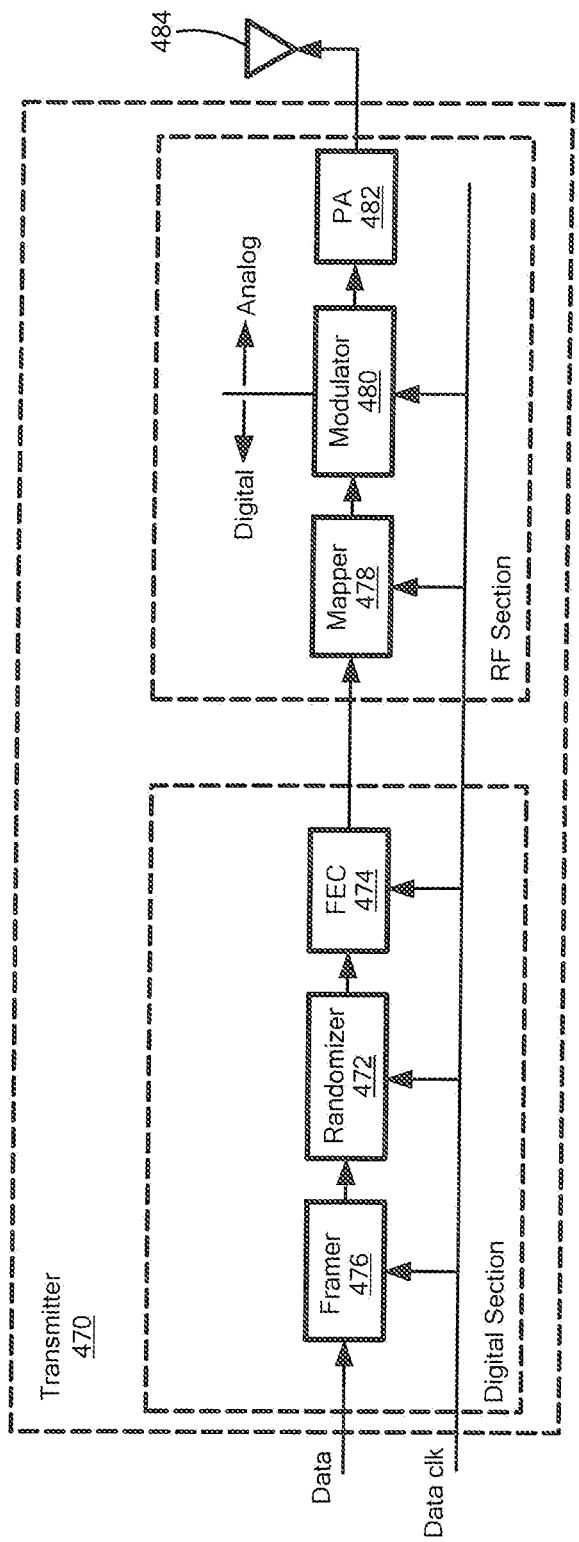
FIG. 4B is a schematic representation of a prior art transmitter.

FIG. 4A shows a prior art constant baud receiver 450 having an antenna 452, LNA 454, ADC 456, matched filter 458, demodulator 460, mapping module 462, de-framing module 464, FEC module 466, and de-randomizer module 468. The constant baud receiver 450 is well known to one of ordinary skill in the art. FIG. 4B shows a prior art constant baud transmitter 470 having data provided to a framing module 476, randomizer module 472, a FEC module 474, a mapper module 478, a modulator module 480, a PA module 482, and an antenna 484. As can be seen, the prior art transmitter 470 and receiver 450 do not perform the encoding/decoding that is performed in the constant baud rate embodiments of the invention.

Figure 5:
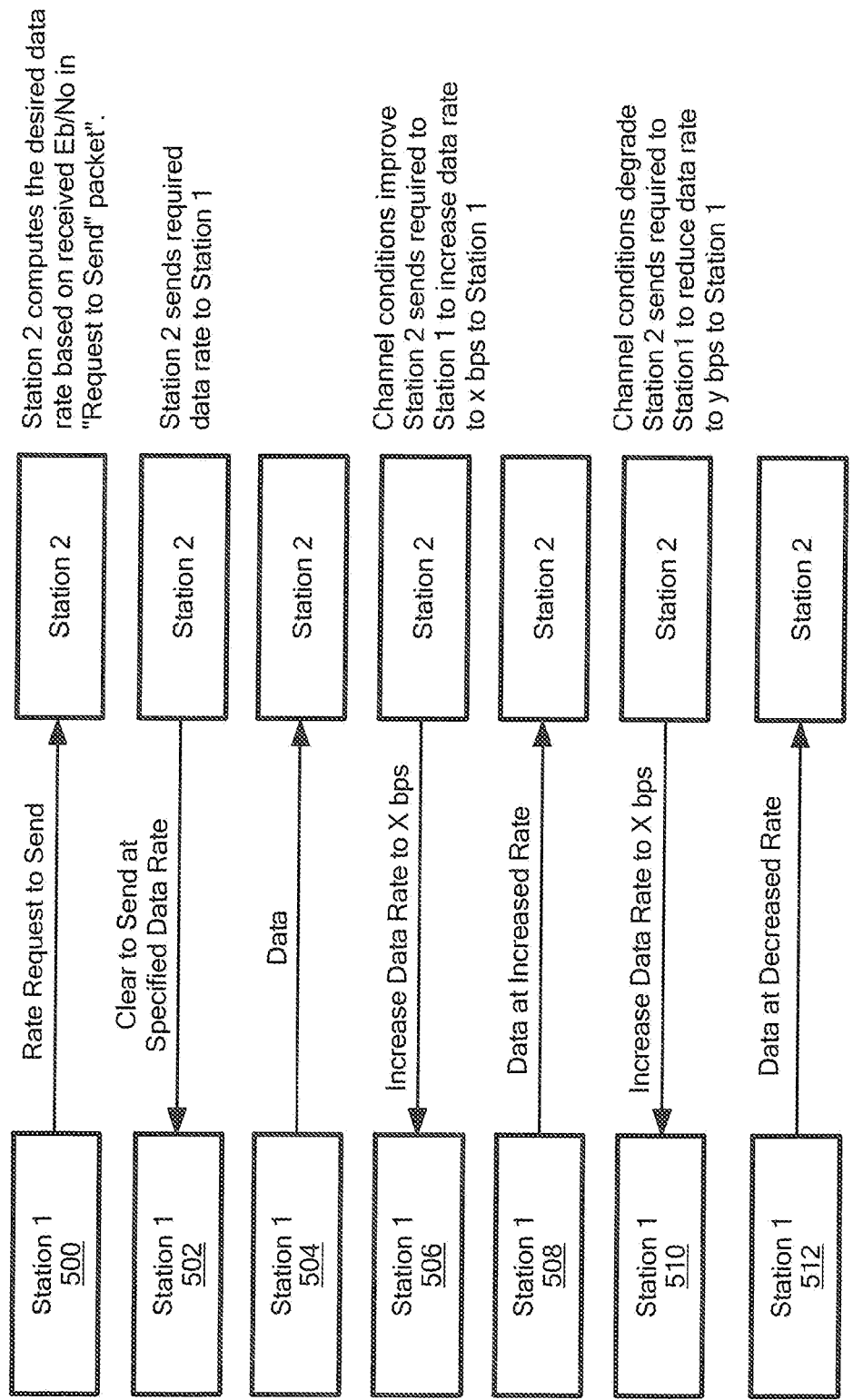
FIG. 5 is a diagram showing interaction between first and second stations having constant baud rate communication.

FIG. 5 shows an illustrative interaction sequence between first and second stations having constant baud rate transmit/receive functionality. In step 500, the first station sends a rate request to send packet to the second station which computes the desired data rate based on the received Eb/No in the Rate Request to Send packet. In step 502, the second station sends the required data rate to the first station, such as a Clear to Send packet at the specified data rate.

The first station sends data to the second station in step 504. In step 506, the second station determines that channel conditions have improved and sends to the first station a message to increase the data rate to X bps in response to which the first station sends data at the increased rate in step 508. In step 510, the second station determines that channel conditions have degraded and sends a message to the first station to reduce the data rate to Y bps. In step 512, in response to the message, the first station sends data to the second station at Y bps.

Figure 6:
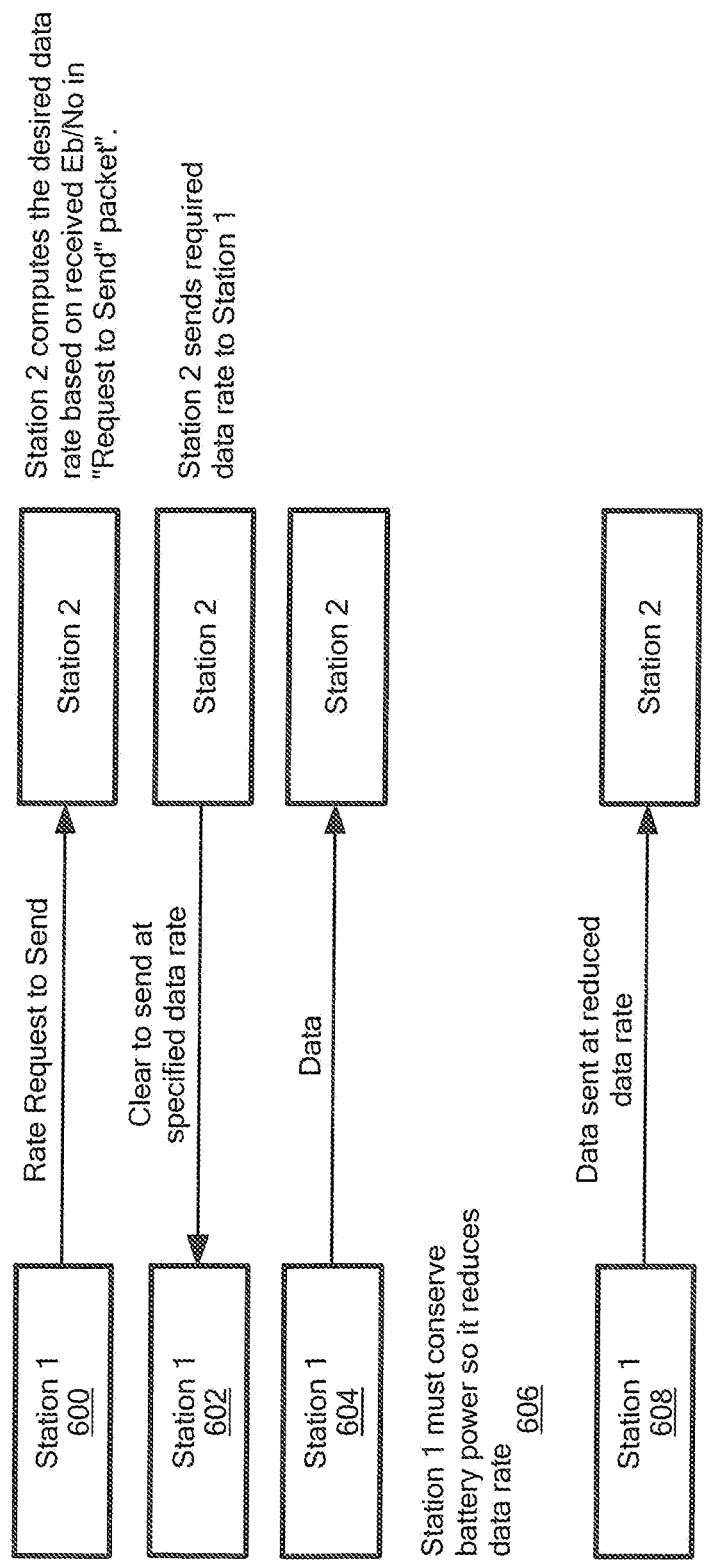
FIG. 6 is a diagram showing interaction between first and second stations in response to changing battery conditions.

FIG. 6 shows an illustrative interaction sequence between first and second stations having constant baud rate transmission and reception in response to changing battery conditions. In step 600, the first station sends a Rate Request to send packet to the second station which computes the desired data rate based on the received Eb/No in the Rate Request to Send packet. In step 602, the second station sends the required data rate to the first station, such as in a Clear to Send packet at the specified data rate. The first station sends data to the second station at the data rate in step 604.

The first station determines in step 606 that battery power must be conserved by reducing the data rate. In step 608, the first station sends data to the second station at the reduced data rate. Note that no coordination between the first and second stations is needed for the data rate reduction made by the first station.

It is understood that embodiments of the invention are applicable to a wide range of applications where it is desirable to successfully close a data link between two points for a reduced data rate. An issue arises when reducing data rates for hardware that is limited to the lowest clock rates that can be internally generated. Since in most applications users want higher data rates, not lower, and that at lower data rates phase noise becomes a greater problem, these lower rates may not be supported. This situation can be experienced with devices, such as cell phones, wireless routers and other WiFi equipment. Embodiments of the invention allow for data rates that are less than the organic data rate of the system while maintaining a spectral envelope consistent with a particular device implementation. The spectral envelop of a system is determined in part by the system baud rate. The logical mapping of bits to Bauds does not change the spectral characteristics so long as the baud rate is constant.

Example

Assume a system has a minimum data rate of 1 Mbps because the reference oscillator's close in phase noise is too great to meet FCC spectral requirements at lower frequencies. Further suppose that one wishes to transmit data from a device that has a maximum data rate of 250 Kbps. Since one cannot lower the transmitter's data rate below 1 MHz an illustrative embodiment of the invention can encode the data to be transmitted by a factor of four. So long as the encoder runs at the transmitter's 1 MHz rate, the transmitter will see a constant baud rate of 1 Mbaud while the underlying data rate is 250 kbps. The signals spectral envelope will remain at 2 MHz assuming BPSK modulation.

In other applications, cognitive radio systems data rates are continually adjusted according to channel conditions. The receiver and transmitter sync up using a protocol to agree on the required data rate. This includes minimizing protocol exchanges between the receiver and the transmitter to coordinate data rates because a bank of matched filters can be used in the receiver; thereby, allowing the receiver to continually receive data at changing rates. This can also include simplifying the system hardware architecture and allowing the spectral envelop to remain constant. A transmitter can make a decision to reduce the data rate to save battery power. In this case, no coordination is needed with the receiver.

Figure 7:
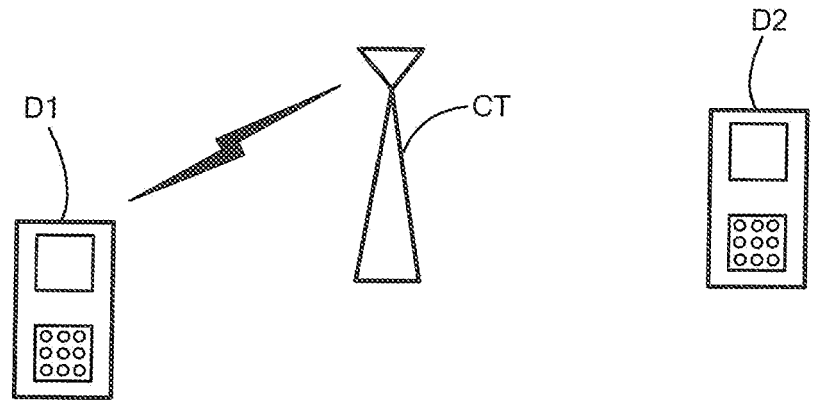
FIG. 7 is a schematic representation of first and second cell devices having constant baud rate communication functionality.

FIG. 7 shows a first device Dl, such as a cell phone, having constant baud rate transmit and receive functionality in accordance with illustrative embodiments of the invention, communicating with a second device Dl, via a cell tower CT. The data rates can be adjusted according to changing channel conditions, as described above.

It is understood that embodiments of the invention can be implemented in a range of guided mediums, such as copper and fiber, that will be readily apparent to one of ordinary skill in the art. It is further understood that embodiments can include optical, as well as, RF communications.

Figure 8:
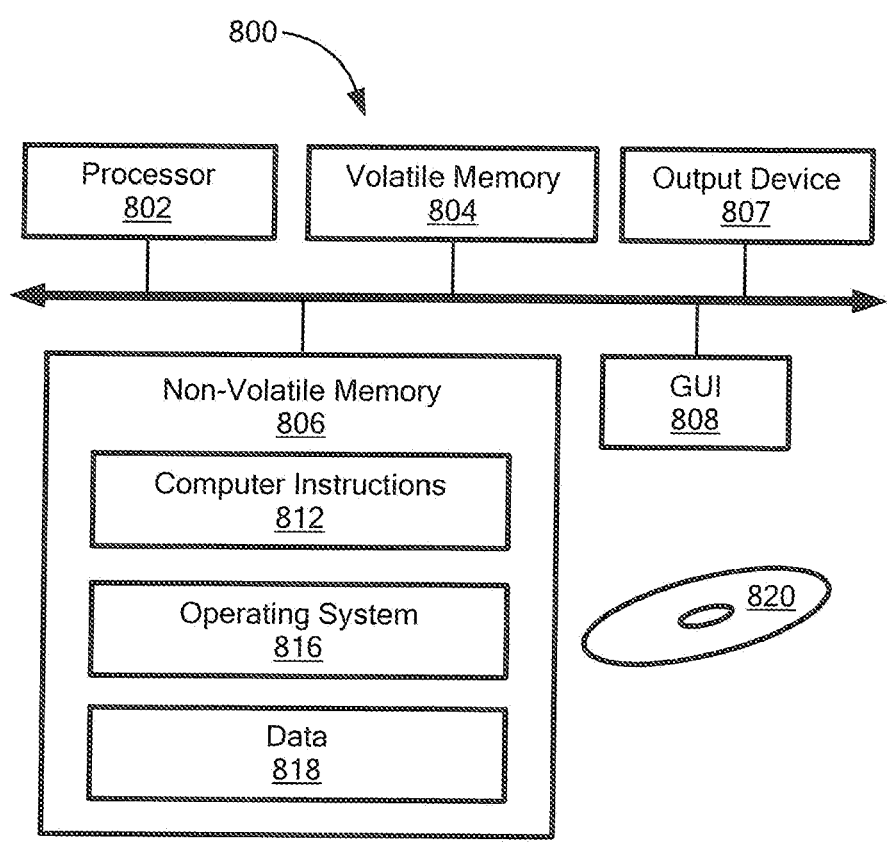
FIG. 8 is a schematic representation of an illustrative computer that can perform at least a portion of the processing described herein.

FIG. 8 shows an exemplary computer 800 that can perform at least part of the processing described herein. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
performing by memory and a processor:
configuring transmitter circuitry to transmit radio-frequency signals comprising data at a varying effective data rate (EDR) at a constant baud rate by encoding the data prior to transmission with a sequence; and
configuring the transmitter circuitry to multiply an energy per bit (Eb) of the transmitted data by the length of the sequence.

2. The method according to claim 1, wherein the sequence comprises a pseudo random number sequence.

3. The method according to claim 1, wherein the sequence comprises a Barker sequence.

4. The method according to claim 1, further including multiplying an energy per bit by a length of the sequence, wherein the EDR corresponds to the data rate divided by the length of the sequence.

5. The method according to claim 1, further including transmitting the data at a constant ratio of energy per bit (Eb) to channel noise density (No).

6. The method according to claim 1, further including varying the effective data rate based upon channel noise.

7. A system, comprising:
a memory; and
a processor,
wherein the processor configures a transmitter to transmit radio-frequency signals comprising data at a varying effective data rate (EDR) at a constant baud rate by encoding the data prior to transmission with a sequence, and multiply an energy per bit (Eb) of the transmitted data by the length of the sequence.

8. The system according to claim 7, wherein the sequence comprises a pseudo random number sequence.

9. The system according to claim 7, wherein the sequence comprises a Barker sequence.

10. The system according to claim 7, wherein the EDR corresponds to the data rate divided by the length of the sequence.

11. The system according to claim 7, wherein the transmitter is further configured to transmit the data at a constant ratio of energy per bit (Eb) to channel noise density (No).

12. The system according to claim 7, wherein the transmitter is further configured to vary the effective data rate based upon channel noise.

13. A method, comprising:
receiving RF signals comprising data, the RF signals received by receiver circuitry; and
performing by a processor:

decoding data that was transmitted at a varying effective data rate (EDR) at a constant baud rate by encoding the data prior to transmission with a sequence and multiplying an energy per bit (Eb) of the transmitted data by the length of the sequence.

14. The method according to claim 13, wherein the sequence comprises a pseudo random number sequence.

15. The method according to claim 13, wherein the sequence comprises a Barker sequence.

16. The method according to claim 13, wherein the received data was transmitted at a constant ratio of energy per bit (Eb) to channel noise density (No).

17. The method according to claim 13, wherein the received data was transmitted after varying the effective data rate based upon channel noise.

18. A method, comprising:
performing by a processor:
varying an effective data rate (EDR) between a receiver and a transmitter configured to transmit data at a constant baud rate, the varying based on using a sequence to encode the data prior to transmission by the transmitter and multiply an energy per bit (Eb) of the transmitted data by the length of the sequence.

19. The method according to claim 18, further comprising:
varying a filter bandwidth of a filter at the receiver, based on changes in the EDR.

20. The method according to claim 18, further comprising:
selecting at the receiver, a filter from a parallel bank of matched filters based on the EDR associated with the transmit data.

\* \* \* \* \*